(12) United States Patent
Davis

(10) Patent No.: US 7,002,029 B2
(45) Date of Patent: Feb. 21, 2006

(54) OIL EXTRACTION PROCESS AND APPARATUS THEREFOR

(75) Inventor: John Henry Davis, Schoenenberg an der Thur (CH)

(73) Assignee: Extractis International Ltd., London (GB)

(*) Notice: Subject to any disclaimer, the term of this patent is extended or adjusted under 35 U.S.C. 154(b) by 219 days.

(21) Appl. No.: 10/478,566

(22) PCT Filed: Jan. 17, 2002

(86) PCT No.: PCT/IB02/00151

§ 371 (c)(1),
(2), (4) Date: Nov. 20, 2003

(87) PCT Pub. No.: WO03/057342

PCT Pub. Date: Jul. 17, 2003

(65) Prior Publication Data

US 2004/0147769 A1 Jul. 29, 2004

(30) Foreign Application Priority Data

Jan. 8, 2002 (EP) .......................................... 02000484

(51) Int. Cl.
*C07C 1/00* (2006.01)

(52) U.S. Cl. ............................... 554/16; 554/9; 554/12; 261/76

(58) Field of Classification Search ..................... 554/9, 554/12, 16; 261/76
See application file for complete search history.

(56) References Cited

U.S. PATENT DOCUMENTS

| 1,802,533 A | 4/1931 | Emmet |
| 2,254,245 A | 9/1941 | Rosenthal |
| 4,776,104 A | 10/1988 | Kuboyama |
| 5,041,245 A | 8/1991 | Benado |
| 5,170,697 A | 12/1992 | Kuboyama |
| 5,980,964 A | 11/1999 | Walters et al. |
| 6,225,483 B1 | 5/2001 | Franke |
| 6,248,910 B1 | 6/2001 | Franke |

FOREIGN PATENT DOCUMENTS

EP        0812903 A1    12/1997

*Primary Examiner*—Deborah D. Carr
(74) *Attorney, Agent, or Firm*—Clifford W. Browning; Woodard, Emhardt, Moriarty, McNett & Henry LLP

(57) ABSTRACT

A process for solvent extraction of oils, in an extraction chamber, comprises the formation of a solvent mist with significant adiabatic cooling, whereby a pressure difference between the solvent inlet and outlet of the extraction chamber drives the solvent mist through the raw oil bearing. The solvent is fed to the extraction chamber at pressures exceeding atmospheric pressure, and the outlet of the extraction chamber is subject to a partial vacuum. An apparatus for solvent extraction comprises an extraction chamber for receiving oil bearing raw material therein, said extraction chamber comprising a solvent spray injection system connected via an inlet to a high pressure solvent feed circuit portion, said extraction chamber further connected via an outlet to a low pressure circuit portion connected to a gas recovery vacuum pump system.

18 Claims, 4 Drawing Sheets

OIL EXTRACTION PROCESS AND APPARATUS THEREFOR

This invention relates to a process for extracting oils and fats with the use of a solvent.

This invention relates in particular, but not solely, to the solvent-based extraction of essential oils from natural products. Many plants, seeds and other natural products contain essential oils that can be extracted using a solvent. A commonly used solvent for extraction of oils from natural products is carbon dioxide, which is usually used in its super critical phase during extraction. This makes it necessary to provide apparatus that can contain high pressures. The expense of carbon dioxide extraction means that it can only typically be used for expensive items or in high volume production, examples being pharmaceuticals and instant coffee.

Other commonly used solvents for oil extraction are hydrocarbons, such as butane, isobutane and propane, for example as described in U.S. Pat. No. 1,802,533, U.S. Pat. No. 2,254,245, U.S. Pat. No. 5,041,245, EP 812903, U.S. Pat. No. 5,980,964, and U.S. Pat. No. 6,225,483 B1.

In the extraction processes described in the aforementioned publications, raw material is bathed or wetted with solvent for a sufficiently long time to allow the oils and fats to be extracted to dissolve in the solvent, or to form a miscella floating on the solvent, the solvent subsequently being removed by heating or by means of a vacuum to boil off the solvent. The heating of the extracted solvent and oil mixture is disadvantageous since it destroys some of the qualities of the extracted oil, affecting for example its flavour, olfactory profile, vitamin content and other heat sensitive components.

Extraction processes as described in U.S. Pat. No. 2,254,245, U.S. Pat. No. 5,980,964 and U.S. Pat. No. 6,225,483 suggest the use of cold solvents for extraction. The cold solvent however or raw material, is chilled by a cooling system, which is energy intensive and therefore fairly costly to operate.

A further disadvantage of known extraction processes is that they use large quantities of solvent. Process times are relatively high in view of the need to bathe the raw material in the solvent for a lengthy period of time, compounded by the need to subsequently remove the solvent from the extracted oils and fats. It is also difficult with known extraction methods to obtain very high yields of oils from raw materials without multiple extraction passes. Besides the time and expense, subjecting material to multiple extraction runs, is not without adverse effects on the qualities of the extracted oil. The yield and olfactory profile of oils extracted from many plants is of great importance, particularly for plants with low oil content that are considered to be relatively rare.

It is an object of this invention to provide a process for extracting oils from oil bearing material, by solvent extraction, that is effective and economical.

It would be advantageous to provide a process for solvent extraction of oils and oil fats from plant material that produces high quality oils, in particular as concerns their flavour or olfactory profile.

It would be advantageous to provide a solvent extraction process that produces high yields of oil from the starting material.

It would be advantageous to provide a solvent-based extraction process that uses low quantities of solvent.

It is a further object of this invention to provide an apparatus for carrying out the solvent-based extraction processes mentioned above.

It would be advantageous to provide an apparatus for solvent-based extraction that is economical and simple to operate.

Objects of this invention have been achieved by providing a process for solvent extraction of oils according to claim 1.

Disclosed herein is a process for extracting oils and oil fats from oil and/or fat bearing raw material, comprising the formation of a solvent mist generting significant adiabatic cooling of oil bearing material in an extraction chamber, whereby a pressure difference between an inlet and an outlet of the extraction chamber drives the mist through the oil bearing material, the pressure at the extraction chamber outlet dropping below atmospheric pressure by action of a partial vacuum.

Also disclosed herein is an apparatus for solvent extraction comprising an extraction chamber for receiving oil bearing material therein, said extraction chamber comprising a solvent spray injection system connected via an inlet to a high pressure solvent feed circuit portion, said extraction chamber connected via an outlet to a low pressure circuit portion connected to a gas recovery vacuum pump system.

Advantageously, the rapid freezing of oil bearing raw material and the flow of a super critical mist through the frozen raw material washes the oils from the material in an effective and efficient manner. In particular, small quantities of solvent are used in comparison to conventional methods in which the raw material is soaked in solvent. The low solvent use significantly improves removal of solvent from extracted oils, and with the absence of heating, ensures extraction of oils with high olfactory and flavour profiles. Furthermore, the process is particularly energy efficient, since no cooling of solvent or raw material is required on the one hand, and, on the other hand, heating is not required for solvent extraction.

Further objects and advantageous aspects of this invention are set forth in the claims or will become apparent from the following description, with reference to the figures in which:

Figure 1:
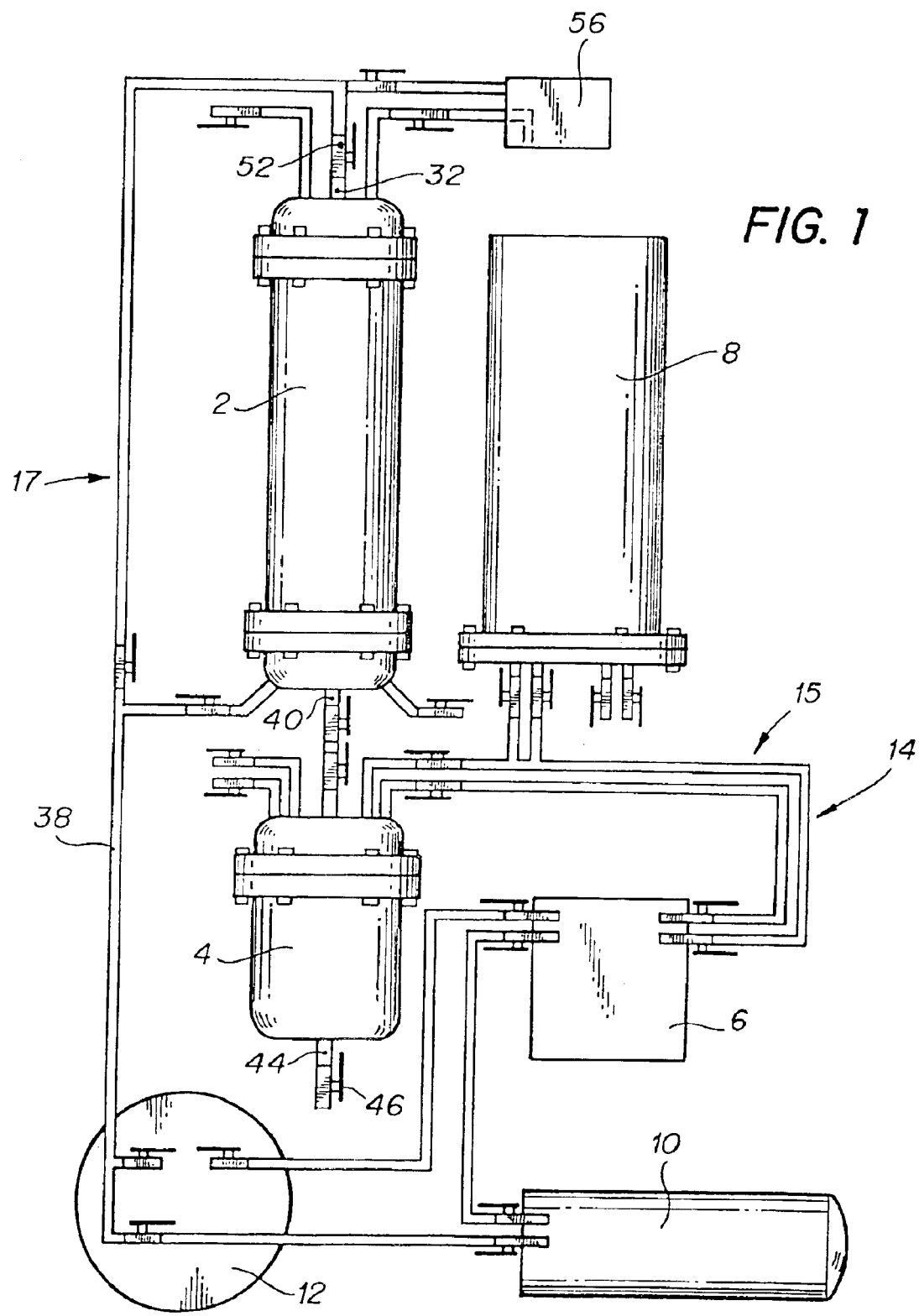
FIG. 1 is a simplified view of an apparatus for solvent extraction according to this invention.

Referring to the figures, in particular FIG. 1, an oil extraction apparatus is shown comprising an extraction chamber 2, an oil collection chamber 4, a solvent recovery pump system 6, a vacuum chamber 8, an overpressure and condensation tank 10, and a solvent tank 12 various tanks and chambers are interconnected by solvent circulation circuit 4 comprising a high pressure circuit portion 17 and a low pressure circuit portion 15. The circuit comprises a number of conduits, pipes or other gas flow means, whereby the arrows indicate the principal direction of flow of solvent.

Figure 2A:
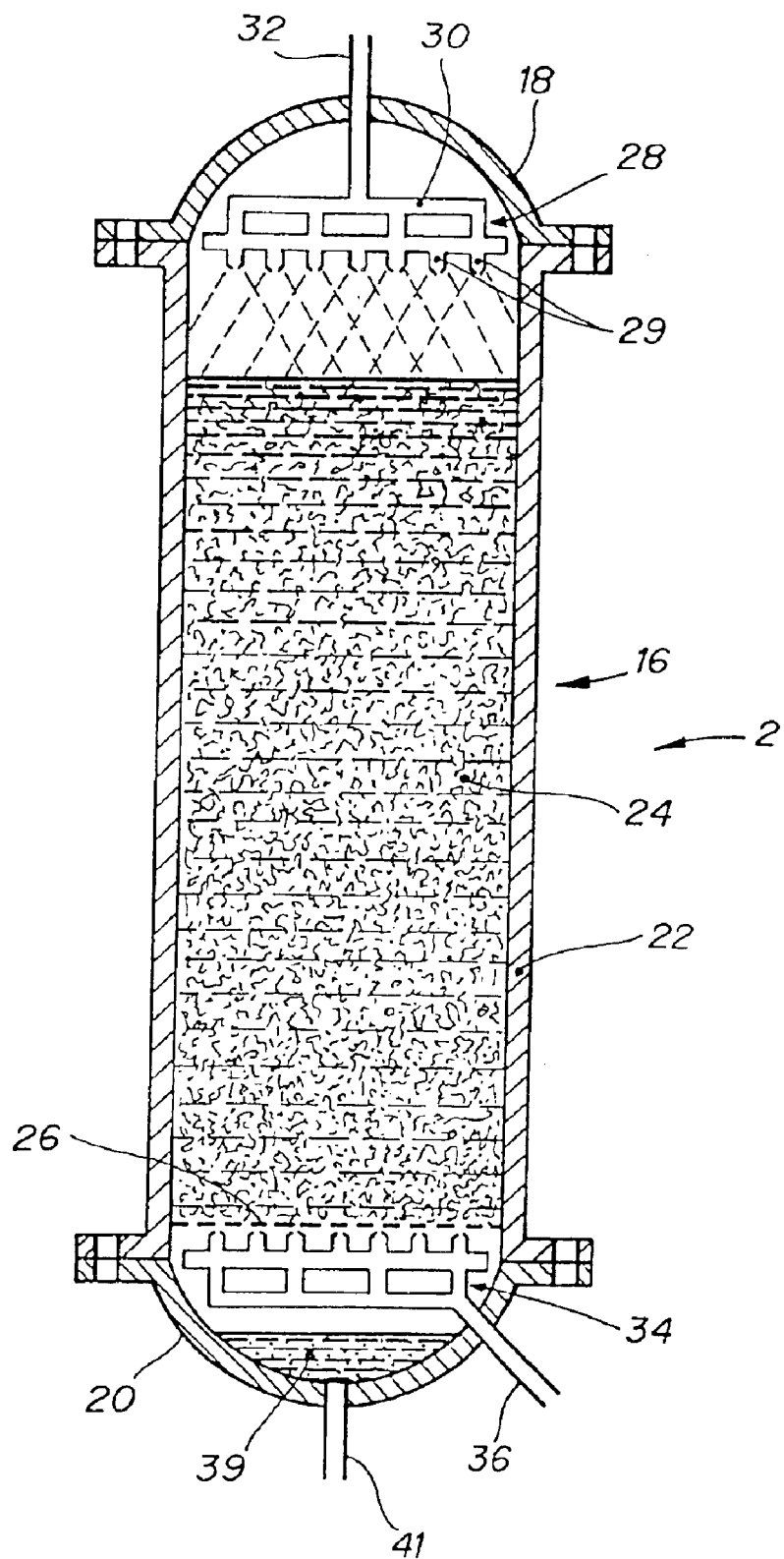
FIG. 2a is a cross-sectional view through an extraction chamber of an extraction apparatus according to this invention.
Figure 2B:
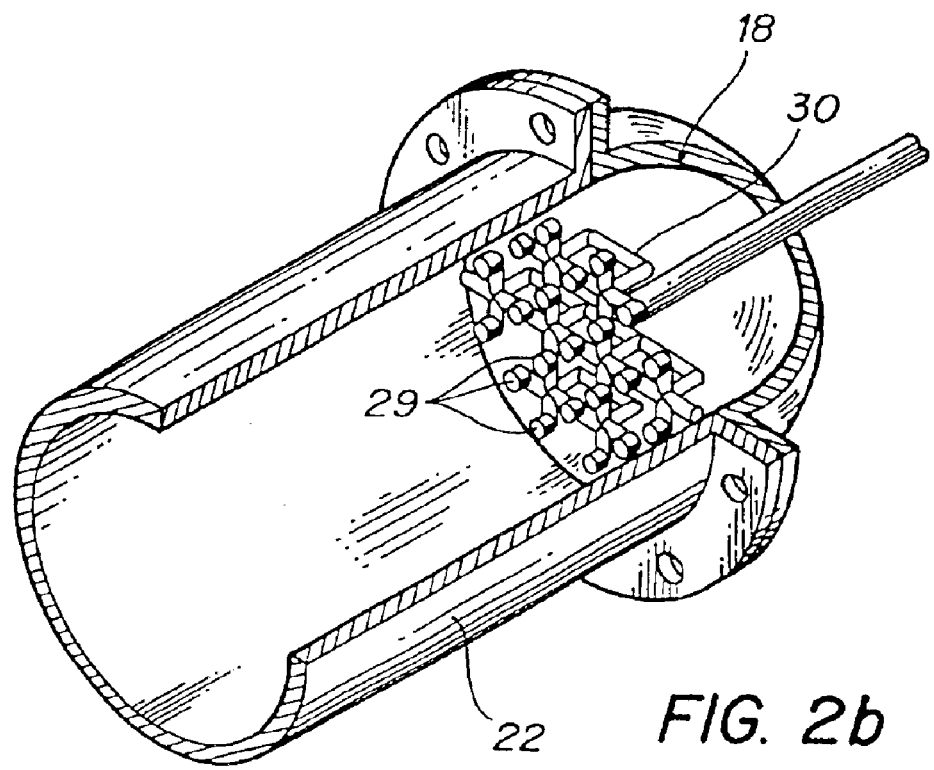
FIG. 2b is a perspective cross-sectional view of an upper part of the extraction chamber according to FIG. 2A.
Figure 2C:
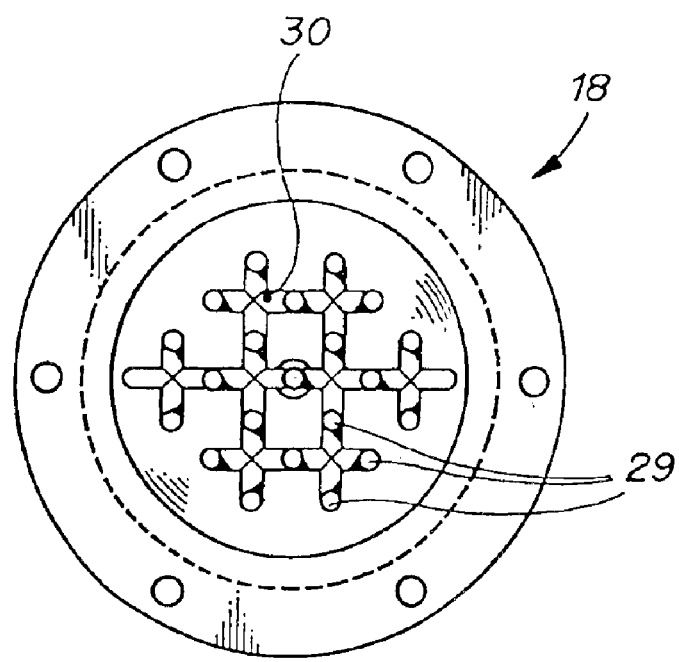
FIG. 2c is a view from below of a top end of the extraction chamber of FIG. 2a, showing the solvent injection system.

Referring to FIGS. 2a to 2c, the extraction chamber 2 comprises a casing 16 comprising upper and lower cover portions 18, 20 removably mounted at opposed ends of a central tubular portion 22 defining a volume therein for receiving an oil bearing material 24. The oil bearing material 24 may be placed in the extraction chamber by removing the top cover portion 18 and packing in the material which rests on a sieve, for example a removable perforated metal plate 26 seated at the bottom of the tubular portion 22 but spaced at a certain distance above the bottom cover portion 20. Depending on the type of raw material, the amount, and the extraction process parameters such as pressure and solvent type, the oil bearing raw material may either be loosely packed in the collection chamber or tightly packed, for example by tamping, using a ram or similar technique. The sieve 26 may be interchanged and adapted to retain the smallest particles of the oil bearing raw material.

The upper cover portion 18 comprises a solvent spray injection system 28 comprising a plurality of spray nozzles 29 and a solvent distribution circuit 30 interconnecting the nozzles 29 with a solvent inlet 32 for distributing solvent to the plurality of nozzles. The distribution circuit 30 may comprise piping, for example metal piping, able to withstand the solvent injection pressures provided for in the invention, but the distribution circuit may also be integrally formed in the cover portion or other member. The nozzles 29 are preferably provided with a venturi-shaped orifice for accelerating the solvent and producing a fine mist, the nozzles being distributed over the cross section of the chamber so as to distribute the mist as evenly as possible over the cross-sectional surface of the chamber. An injection system 34 may also be provided at the bottom end of the extraction chamber, for example fixed to the lower cover portion 20 and connected to an inlet 36 interconnected to a conduit 38 through which pressurized solvent flows.

The lower injection system 34 serves in particular to enable a blast of pressurized solvent or gas to be injected from the bottom to agitate the raw material 24 between extraction passes, or at an intermediate stage during extraction. The blast injection serves to disturb and resettle the raw material 24 in order to prevent a channel or channels of low resistance forming through the raw material during extraction, which reduce the extraction efficacy. Considering the purpose of the lower injection system 36, it is also possible to connect the inlet 36 thereof to a pressurized gas source other than the solvent circuit of the apparatus.

At the bottom of the extraction chamber, a further sieve or filter may be provided to retain loose particles of material that may have passed through the sieve 26. The filter 39 may advantageously comprise a molecular sieve that retains or absorbs condensates, the filter 39 being replaced or removed for drying at regular intervals, for example after one or a certain number of extraction passes. Solvent and extracted oils and fats exit the extraction chamber through an outlet 40 of significantly smaller cross section than the extraction chamber in order to accelerate the solvent with its mixed and dissolved oils and fats.

Figure 3B:
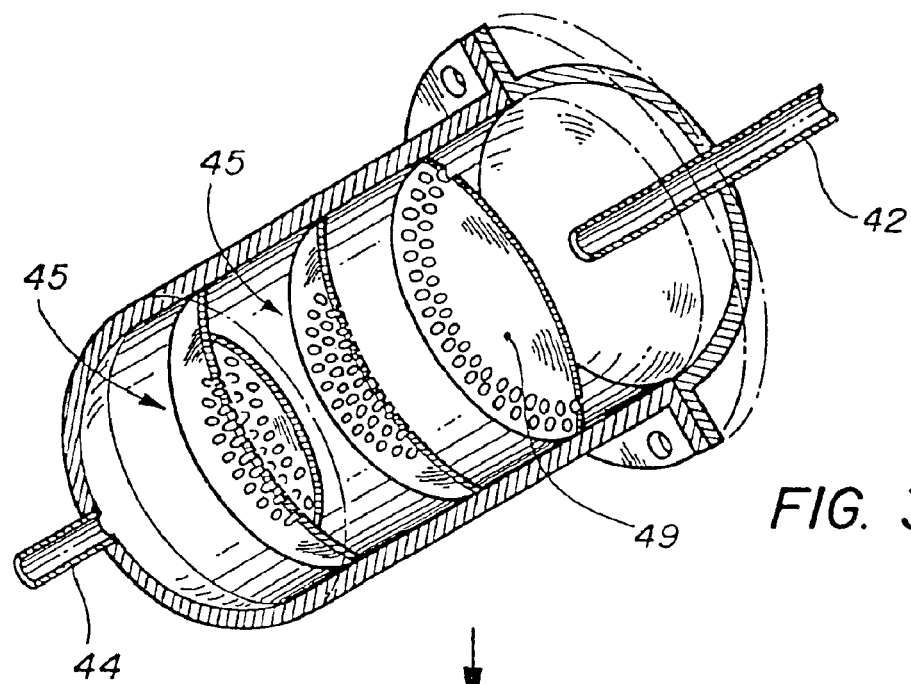
FIG. 3b is a perspective cross-sectional view of the oil collection chamber.
Figure 3A:
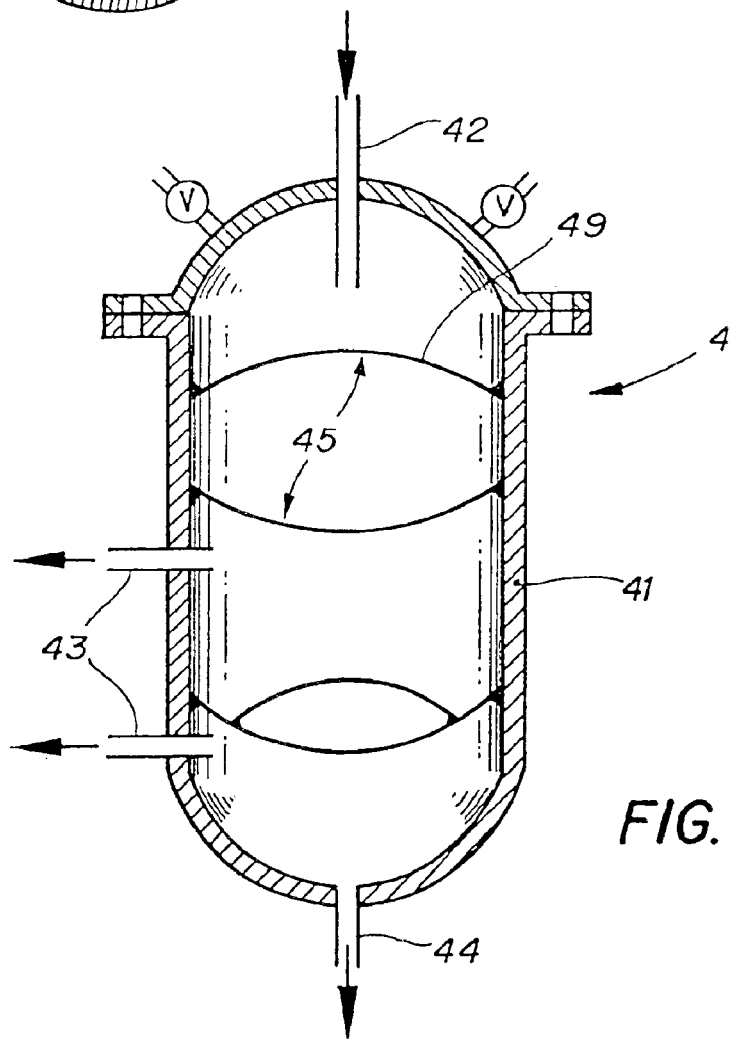
FIG. 3a is a cross-sectional view of an oil collection chamber of the apparatus according to FIG. 1.

Referring to FIGS. 3*a* and 3*b*, the oil collection chamber 4 comprises a casing 41 defining a chamber therein connected at one end to the extraction chamber via an inlet conduit 42 and to a low pressure portion 15 of the solvent circuit via an outlet 43 separated from the inlet by one or a plurality of baffles 45 designed to collect the extracted oils and oil fats and resins, and prevent particles thereof from being aspirated into the low pressure solvent circuit portion. Extracted oils collecting at the bottom of the collection chamber may be removed via a drain 44 whose opening is controlled by a tap or valve 46 (as best seen in FIG. 1). The baffle plates may be provided with curved shapes, generally convex for baffle plates with drain holes 48 near the outer circumference, and generally concave for the baffle plate having drain holes near the centre, the concave or convex shape being defined on the oil solvent receiving side thereof. The convex baffles 49 assist in solvent extraction by causing oil droplets projected thereon to spread and flow across the baffle while solvent gas flows thereover. The concave baffles help to collect the oil and prevent droplets from being aspirated into the recovery pump system.

In a procedure for extracting lipids and lipid soluble elements ("oils"), the extraction chamber 2 is first loaded with raw oil bearing material and the top cover portion (18) is subsequently sealingly closed to the casing portion 22. A valve 52 (see FIG. 1) controlling the solvent inlet 32 of the extraction chamber is in a closed position while the pumping system 6, which may comprise one or more pumps, feeds and pressurizes solvent in the solvent tank 12 and in the high pressure circuit portion 17 that leads to the extraction chamber inlet 32.

On the low pressure circuit portion 15, a strong vacuum is produced, drawing air out of the extraction chamber 2, the collection chamber 4, and the vacuum tank 8. The vacuum tank 8 is particularly advantageous in that it helps to generate and maintain a stronger vacuum, especially in the initial extraction phase when the extraction chamber inlet valve 52 is opened. For this purpose, the vacuum chamber preferably has at least double the volume of the extraction chamber, but more advantageously around three or more times the volume of the extraction chamber.

The pressure of solvent is at least at a pressure required to maintain the solvent in its liquid phase around ambient temperature. The optimal operating pressure however may also be adjusted to take account of the volume and density of raw oil bearing material in the extraction chamber.

Another consideration is the increased cost and complexity of the apparatus as pressures increase, whereby, in order to provide a relatively economical and effective extraction process, it is advantageous to operate within a pressure range of one to five bars, although significantly greater pressures could be employed if needed, without departing from the scope of the invention.

One of the preferred solvents for use in the process according to this invention, is high purity (for example 99.99% purity), isobutane under approximately 2.5 bars pressure in the high pressure circuit portion. After pressurizing the high pressure circuit portion and depressurizing the low pressure circuit portion, the inlet valve 52 is opened. The pressure differential causes the solvent to accelerate through the nozzle 29 of the injection system 28 and a fine solvent mist is generated. The mist sprayed out of the nozzles 29 is drawn through the raw oil bearing material 24, through the sieves and filters 26, 39 and exits through the outlet 40 into the collection chamber 4.

The acceleration of solvent through the nozzles 29, which preferably have a venturi shaped orifices, and the subsequent partial liquid to gas transformation of solvent mist sprayed out of the nozzles, creates a very rapid and significant adiabatic cooling that instantly freezes the raw material 24 as the solvent mist is forced by the pressure differential down through the extraction chamber. Without wishing to be bound by theory, the very rapid freezing of the oils bearing raw material makes the oils more available to the solvent by freezing aqueous and other non-lipid components. Furthermore, the flow of solvent mist and vapour washes the oils towards the outlet of the extraction chamber, preventing or significantly reducing the sticking or collection of oils against the walls or parts of the extraction chamber and to the remaining fibres or meat of the raw material.

As the process according to this invention does not require that all of the oils be dissolved in solvent, significantly lower quantities of solvent are required than in conventional solutions that require soaking of raw material and dissolving of oils for extraction with the solvent. In plant and other living material, the rapid freezing not only has the effect of retaining aqueous components, chlorophyll and fibres, but it is believed that the rupture of cells during the freezing process helps to extract the oils. In addition, also considering that the process according to this invention does not require heating of the extracted oils to remove residual solvent (although a certain amount of warming could be provided if deemed useful) the high and low fractions of oils are effectively extracted, thus providing the extracted oils with a particularly rich olfactory profile and flavour. The freezing effect and high yield extraction provided by the above-mentioned process is important in capturing volatiles and thermo-labile components in this raw material, such components including ketones, esters and aldehydes which might otherwise be lost and/or destroyed in steam distillation or when other solvents are used with higher boiling points. Various phytonutrients are also found in oils extracted with a process according to this invention.

In conventional processes, it is difficult to obtain for example the last five percent of higher turpines. These give the oils a taste and olfactory profile which is unique in capturing the high notes as well as the base notes of the original fresh material.

The solvent mist produced in the above-described process exhibits a drop in temperature that may be in the range of $-50$ to $-100°$ C.

A further significant advantage of this process is that it does not require any additional cooling system to chill the solvent and is therefore energy efficient compared to conventional cold solvent extraction processes, also taking into consideration the lower volume of solvent required in the process according to this invention.

Furthermore, contrary to conventional extraction methods, since the raw material does not bathe in solvent, no flashing with other gases such as nitrogen is required at the end of the extraction process.

During the extraction process, the recovery pump station 6 continues to maintain a strong vacuum by drawing the solvent gases exiting the collection chamber 4 and subsequently pressurizing the gases that are transferred to the solvent tank 5 and/or to the overpressure and condensation tank 6, which may serve, on the one hand, as an overpressure buffer of the high pressure circuit portion as well as a tank for condensing the gaseous solvent. In order to improve the thermodynamic efficiency of the apparatus, a heat exchanger could be provided between the extraction and oil conduction chambers 2, 4 on the one hand and the recovery pump system 6 and overpressure tank 10 on the other hand.

As the solvent and oil pass through the outlet extraction chamber 40, the reduced section of the outlet accelerates and cools the mixture and solution. This helps to separate off the solvent from the oils because of its reduced solubility at lower temperatures. The vacuum in the collection chamber 4 flashes off the solvent from the oils without the need for any external heating of the extract which collects at the bottom of the extraction chamber after having passed the baffles. The convex baffles improve solvent removal and advantageously cause oil droplets to collect into larger drops and flow to the bottom of the collection chamber, whereas the solvent gas flashed off the oil extract is sucked into the recovery pump station 6 and subsequently to the high pressure circuit portion.

It may be understood that the solvent that is used in this invention may be any organic compound that is a solvent for the desired extract. It will usually be a gas under ambient conditions that liquefies at a temperature in the range of $-60°$ C. to $0°$ C. at ambient pressure. Other examples of suitable extractants for use in the invention are hydrocarbon gases such as butane, propane and analogous gases with similar physical properties, or halocarbon variants such as freons. The terms "hydrocarbon" and "halocarbon", as used herein, do not exclude halohydrocarbons or indeed other substituents on carbon. Hydrocarbons and halocarbons are readily available and their use does not require that the extraction apparatus should withstand very high pressures, for example as required in carbon dioxide extraction.

Examples of raw materials that may be processed with the apparatus according to this invention include plants such as flowers, vegetables, fruits, seeds, and fish or other animal meats. In view of the rapid low temperature freezing effect, the raw material need not be dried and can be extracted either fresh or dried. When plants from different species are combined in the extraction chamber together to be extracted as one, the oils may undergo a reaction in the chamber and combined to produce new molecules of a completely new oil. Without wishing to be bound by theory, the new oils may exhibit different crystal formations than either of the original oils and cannot be separated into the original oils.

Other than the extraction of oils from living material the process according to this invention may also advantageously be used for removing mineral oils from contaminated materials such as oil filters, sand, or soil, whereby the low solvent usage and energy efficient process according to this invention is particularly advantageous in such applications.

It may be noted that the relative simplicity of the extraction apparatus described above enables the apparatus to be easily scaled from a portable size, for example for field testing the properties of cultivated plants, for example their ripeness or readiness to be harvested. The apparatus may also be made on a very large scale to receive raw materials in the order of $10^3$ kg for large scale industrial extraction or decontamination.

It has been empirically found that using the process according to this invention for many raw materials requires a proportion between roughly 4:1 and 2:1 quantities of solvent with respect to extracted oil in the first extraction run.

It will be understood that it is possible in the extraction process according to the invention to make more than one extraction run through raw oil bearing material in order to increase the yield, despite the already high yield of the first extraction run.

The apparatus and process according to this invention also allows for the use of a second solvent or the addition of a modifier or additive prior, during or subsequent the primary extraction process. The modifier, second solvent, or additive may be supplied from an additional chamber 56 (see FIG. 1) interconnected to the high pressure circuit portion 17 and to the extraction chamber 2.

It has been advantageously found that a small amount of 70 to 100% pure ethanol in addition to a surfactant such as lecithin makes certain fats more available to the solvent such that the extraction runs on some organic materials can be shortened. Moreover, some additional oleoresins also become available if the proportions of the additive and primary solvent are correctly balanced.

EXAMPLES

1a) Control process using conventional extraction process.

Raw material: chompalote, a dried and ground chile powder.

823.25 grams of dried powder was extracted using a conventional method: pump in gas and let it sit for one hour; pump out and recover oils using 200° C. degree heat.

89 grams of oil was recovered; the oil was dark red in colour, with good smell. A second soaking obtained 12 more grams of oil, which was lighter red in colour and with less smell after recovery.

A total of 101 grams of red oil was obtained using 10 litres of liquid solvent (isobutane) each time (total 20 litres solvent).

1b) In another extraction using a process according to this invention:

823.25 grams of raw and ground dried chile peppers were extracted, starting at room temperature 24° C. for ten minutes using four litres of high purity solvent (isobutane) in super critical mist conditions to obtain 161 grams of a fine thick red oil with a superior flavour and smell profile, well noted by all present.

This represents a substantial gain in yield and reduction in time spent during extraction. The superior flavour and odour profile are due partly to gas recovery without using any heat, instead using the method of drawing extracts with a strong vacuum, further providing baffle surface areas in the collection chamber for the low temperature oil to congregate on and allow for easy separation of gas from super critical oils. Upper fine fractions disappear in methods using heat to recover gas to liquid state. Moreover, the use of high purity solvent (99.999% pure isobutane in particular) results in a more complete removal. The temperature in the extraction chamber during the extraction process varied from about −40° C. to −90° C.

3a) In another example, 1000 grams of cocoa nibs were extracted using the conventional method mentioned in the first example.

10 litres of liquid solvent were used in each cycle and 338 grams of cocoa butter were extracted from two soakings and recoveries, each soaking and recovery process lasting approximately four hours. The cocoa butter was a mix of cocoa butter and white cake. 662 grams of cocoa powder were recovered as well.

3b) In an extraction process according to the invention, one kilogram of cocoa powder was extracted to provide 523 grams of cocoa butter and cocoa white cake, and 477 grams of cocoa powder, in one step. This cocoa powder and cocoa butter and white cake have never reached room temperature during process which lasted 14 minutes at initial and ambient room temperature and used four litres of solvent (isobutane). The temperature in the extraction chamber during the extraction process varied from about −40° C. to −90° C.

4a) In another extraction using Cassia bark 12 kilos were extracted using the above mentioned conventional control method to obtain an oil yield of 0.89%. This is near the industry standard of 1% to 2% from this material depending on bark content and harvest conditions, 2% being the maximum yield hoped for using any conventional method.

4b) In a process according to this invention for extracting oils from cassia bark, a 3.9% yield was obtained with a portion of the oil spontaneously crystallizing on contact with air. Both extractions (4a and 4b) were made from raw materials obtained from the same source at the same time and divided.

5) In another example, ginko leaves were extracted using a conventional method and a method according to the invention discussed above. The conventional method resulted in a 1.6% yield whereas the method according to this invention resulted in a 5.4% oil extract yield, with a percentage of ginkolic acid in the second extract that was 28% higher than in the control.

What is claimed is:

1. Process for solvent extraction of oils in oil bearing material, in an extraction chamber, comprising the formation of a solvent mist with significant adiabatic cooling, whereby a pressure difference between an inlet and an outlet of the extraction chamber drives the mist through the oil bearing material, the outlet being subjected to the action of a vacuum.

2. Process according to claim 1, wherein the solvent is supplied to the extraction chamber inlet at a pressure exceeding atmospheric pressure.

3. Process according the preceding claim, wherein the solvent is supplied at the extraction chamber inlet at a pressure in the range of 2 to 5 bars.

4. Process according to claim 1, wherein the outlet vacuum is generated by a gas recovery pump system interconnected to the outlet via an oil collection chamber.

5. Process according to the preceding claim, wherein oils and solvent are accelerated through a reduced section passage between the extraction chamber and an oil collection chamber.

6. Process according to claim 1, wherein the solvent used is high purity isobutane.

7. Process according to the preceding claim, including adding a second solvent prior to or during said solvent extraction process.

8. Process according to the preceding claim, wherein said second solvent comprises ethanol.

9. Process according to claim 7, wherein a surfactant is added to said second solvent.

10. Process according to claim 1, comprising first and second extraction runs.

11. Apparatus for solvent extraction comprising an extraction chamber for receiving oil bearing material therein, said extraction chamber comprising a solvent spray injection system connected via an inlet to a high pressure solvent feed circuit portion, said extraction chamber connected via an outlet to a low pressure circuit portion connected to a gas recovery pump system.

12. Apparatus according to the preceding claim, further comprising a vacuum tank interconnected to the low pressure circuit portion, said vacuum tank having a volume approximately two times or more than the volume of the extraction chamber.

13. Apparatus according to claim 11, further comprising an oil collection chamber interconnected to the extraction chamber via a reduced section passage.

14. Apparatus according to the preceding claim, wherein the oil collection chamber comprises one or more baffles therein adapted to collect oil droplets.

15. Apparatus according to the preceding claim, wherein at least one baffle has a generally convex shape, as seen from the oil collection side thereof.

16. Apparatus according to claim 11, wherein the extraction chamber further comprises a particle filter and drier at the outlet thereof, adapted to retain particles and/or absorb aqueous condensates.

17. Apparatus according to claim 11, wherein said spray injection system comprises a solvent distribution circuit and a plurality of venturi nozzles adapted to spray a substantially evenly distributed solvent mist across the cross section of the extraction chamber.

18. Apparatus according to claim 11, wherein the extraction chamber comprises a blast nozzle system at a lower end of said extraction chamber for injecting gas or a solvent mist at a bottom end of the oil bearing raw material.

* * * * *